United States Patent [19]
Yoshida et al.

[11] Patent Number: 5,428,672
[45] Date of Patent: Jun. 27, 1995

[54] COMMUNICATION APPARATUS

[75] Inventors: Takehiro Yoshida, Tokyo; Kenzo Sakakibara; Kozo Toda, both of Yokohama, all of Japan

[73] Assignee: Canon Kabushiki Kaisha, Tokyo, Japan

[21] Appl. No.: 111,583

[22] Filed: Aug. 25, 1993

Related U.S. Application Data

[63] Continuation of Ser. No. 914,033, Jul. 14, 1992, abandoned, which is a continuation of Ser. No. 659,463, Feb. 25, 1991, abandoned, which is a continuation of Ser. No. 106,783, Oct. 13, 1987, abandoned.

[30] Foreign Application Priority Data

Oct. 17, 1986 [JP] Japan ................... 61-245327
Oct. 17, 1986 [JP] Japan ................... 61-245328
Jan. 8, 1987 [JP] Japan ................... 62-001108

[51] Int. Cl.⁶ ........................................ H04M 11/08
[52] U.S. Cl. .............................. 379/100; 358/401; 358/442
[58] Field of Search ............... 379/93, 94, 96, 100, 379/102; 358/434, 401, 442, 443

[56] References Cited

U.S. PATENT DOCUMENTS

| | | | |
|---|---|---|---|
| 4,086,443 | 4/1978 | Gorham | 379/100 |
| 4,346,410 | 8/1982 | Maeno | 358/257 |
| 4,353,097 | 10/1982 | Takeda et al. | 358/287 |
| 4,639,553 | 1/1987 | Kiguchi | 379/94 |
| 4,660,218 | 4/1987 | Hashimoto | 379/93 |
| 4,677,660 | 6/1987 | Yoshida | 379/100 |
| 4,717,967 | 1/1988 | Yoshida | 358/280 |
| 4,723,172 | 2/1988 | Matsumoto | 358/280 |
| 4,727,576 | 2/1988 | Yoshida | 379/100 |
| 4,772,955 | 9/1988 | Kurahayashi et al. | 358/257 |
| 4,773,080 | 9/1988 | Nakajima et al. | 379/100 |
| 4,800,439 | 1/1989 | Yoshino | 358/257 |
| 4,815,121 | 3/1989 | Yoshida | 379/100 |
| 4,825,461 | 4/1989 | Kurita et al. | 379/100 |

FOREIGN PATENT DOCUMENTS 60-214676 10/1985 Japan .

Primary Examiner—Richard Hjerpe
Attorney, Agent, or Firm—Fitzpatrick, Cella, Harper & Scinto

[57] ABSTRACT

There is disclosed a communication apparatus to which connected are plural telephone units and data communication units, such as facsimile units, wherein the data communication units can be controlled by instructions from the telephone units.

37 Claims, 12 Drawing Sheets

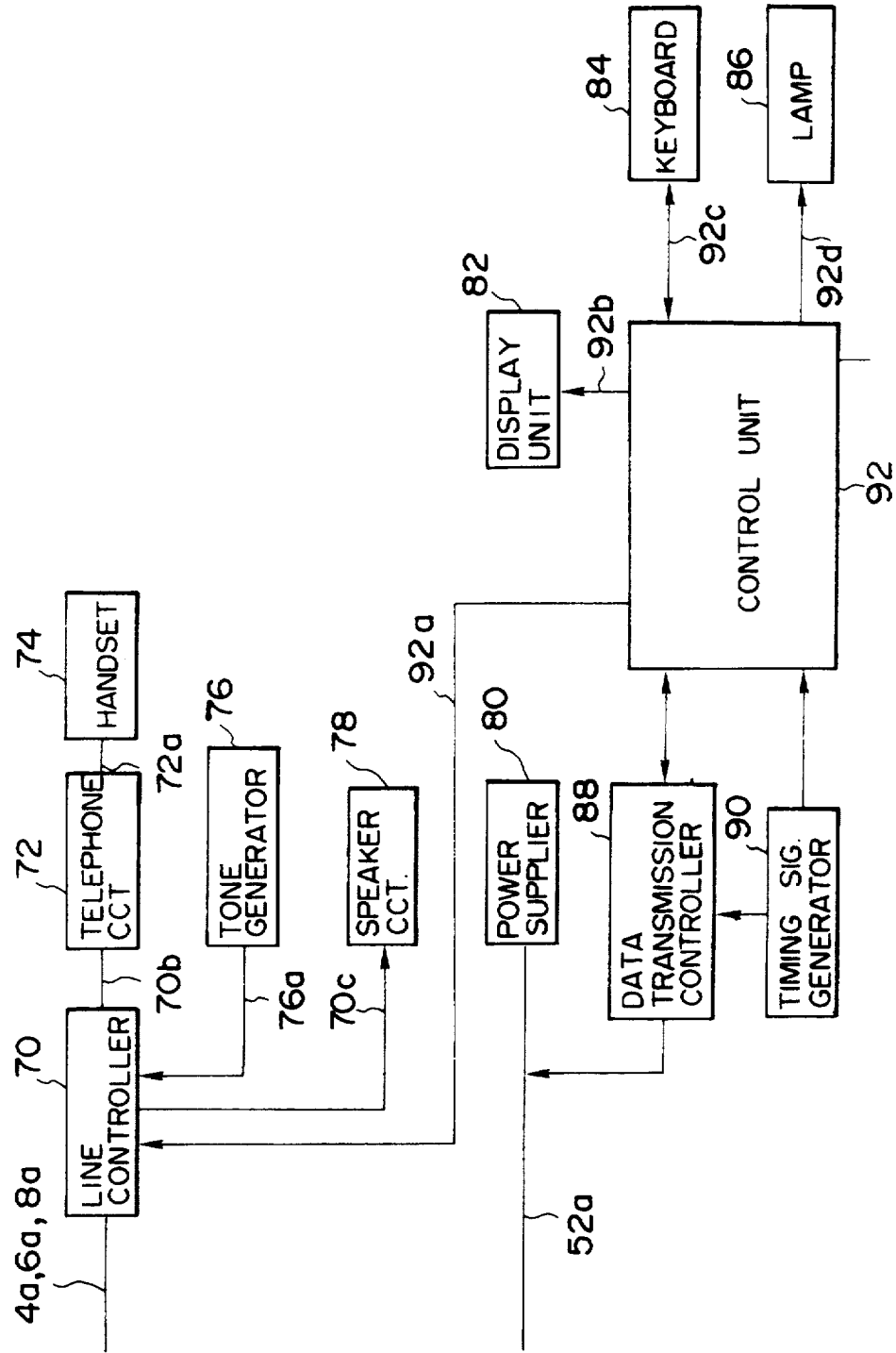

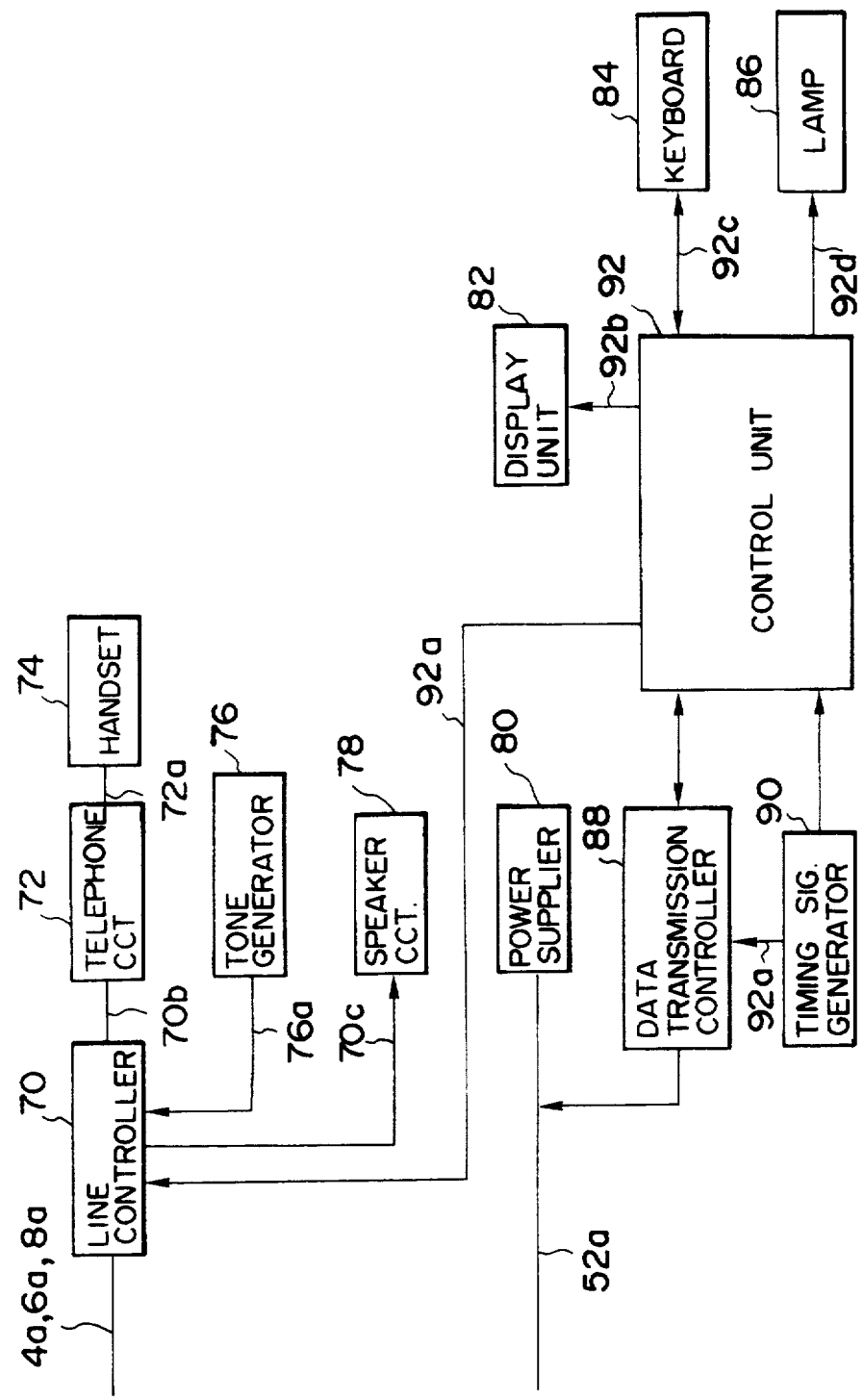

COMMUNICATION APPARATUS

This application is a continuation of application Ser. No. 07/914,033, filed on Jul. 14, 1992, now abandoned, which is a continuation of application Ser. No. 07/659,463, filed Feb. 25, 1991, now abandoned, which is a continuation of application Ser. No. 07/106,783, filed Oct. 13, 1987, now abandoned.

BACKGROUND OF THE INVENTION

1. Field of the Invention

The present invention relates to a communication apparatus, and more particularly a communication apparatus connected to plural terminal units through communication lines.

2. Related Background Art

In such field there is already known a system to be connected, as shown in FIG. 5, to plural telephone units and non-acoustic communication units such as facsimile units through plural telephone lines.

In FIG. 5, two telephone lines (main lines) 2a, 2b are connected to a main unit 2, which can connect three push-button telephone units (touch-tone phones) 4, 6, 8 and a facsimile apparatus 10 to the telephone lines in desired manner.

The telephone unit is not independently connectable to the main line, but a circuit for line control such as making and receiving calls, a channel, a power source etc. are included in the main unit 2. Control of making and receiving call for each telephone unit is automatically executed by the main unit 2.

On the other hand, the facsimile apparatus 10 is usually connectable independently to the line, and, when it is connected to the lines together with the above-mentioned communication system comprising the telephone units 4, 6, 8 and the main unit 2, the lines are switched manually by a switch (not illustrated) or the like. Consequently a signal line 10a connecting the facsimile unit 10 with the main unit 2 is composed of a pair of conductors serving as a communication line only, while each signal line 4a, 6a or 8a connecting each telephone unit with the main unit 2 is composed of two pairs of conductors serving as a communication line and a line for power supply and control.

This conventional system can therefore only achieve the functions of connecting the facsimile unit to the main unit of the telephone system and making a telephone call through a facsimile line when the facsimile unit is not in use. The facsimile unit is so constructed as to be independently connectable directly to the communication line and has a line control function the same as that of the main unit 2, so that an economic communication system cannot be obtained. There is practically no functional combination between the telephone system and the facsimile unit, and it is not possible to control the facsimile unit from the telephone units. Therefore, in case of facsimile communication, the operator has to leave his own desk wherein a telephone unit is placed and to go to the location of the facsimile unit.

Also in facsimile communication in a system shown in FIG. 5 by automatic calling of a destination station with a dial signal generating circuit, if a meaningful signal, or an initial identification signal, cannot be received from the destination station, the station is identified as being unavailable for some reason, and the call is repeated after a predetermined period, for example 1 minute. Then, if a meaningful signal still cannot be received even after a predetermined number of calls (for example 3 calls), the procedure is terminated as an error.

However, if the destination station belongs to a similar communication system in which the facsimile unit is not adjusted at an automatic mode but at a manual mode, communication cannot be made even after repeated calls since a meaningful signal cannot be received. Also if the system does not have a facsimile unit but has only telephone units, an error is identified after a predetermined number of calls are made.

These drawbacks will be encountered also when a data communication apparatus other than a facsimile unit is connected to the line in combination with telephone units.

In a system disclosed in the U.S. patent application Ser. No. 823,286, filed Jan. 28, 1986, of the present applicant, two telephone units and a facsimile apparatus are connected to two telephone lines, to which the telephone units correspond respectively.

SUMMARY OF THE INVENTION

An object of the present invention is to provide an improvement in the communication apparatus.

Another object of the present invention is to eliminate the above-mentioned drawbacks.

Still another object of the present invention is to enable a terminal for data communication to effect line control of another terminal.

Still another object of the present invention is to enable, in a communication system having a terminal for data communication and plural terminals for telephone communication, a telephone terminal to control the data communication terminal.

Still another object of the present invention is to control, in a communication system having a terminal for data communication and plural terminals for telephone communication, a response operation according to the destination in case of making a call or being called from a telephone line.

Still another object of the present invention is to enable, in a communication apparatus in which plural telephone units are connected to a terminal for data communication, a telephone unit to control the data communication terminal.

Still other objects of the present invention will become apparent from the following description of embodiments.

BRIEF DESCRIPTION OF THE DRAWINGS

FIG. 2 is a key for combining FIGS. 2A and 2B;

FIG. 3 is a block diagram of a telephone unit of the first embodiment;

FIG. 6 is a key for combining FIGS. 6A and 6B;

FIG. 7 is a block diagram of a telephone unit of the second embodiment;

DETAILED DESCRIPTION OF THE PREFERRED EMBODIMENTS

Now the present invention will be clarified in detail by embodiments thereof shown in the attached drawings.

A first embodiment is a system in which plural telephone units are connected to a facsimile apparatus and a control unit thereof controls the connection of the plural telephone units, wherein the same or equivalent components as in the above-explained conventional system will be represented by the same numbers and will not be explained further.

Figure 1:
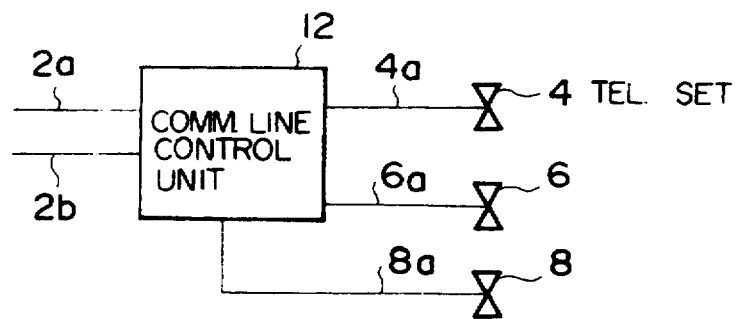
FIG. 1 is a schematic block diagram of a first embodiment of the communication apparatus.
Figure 5:
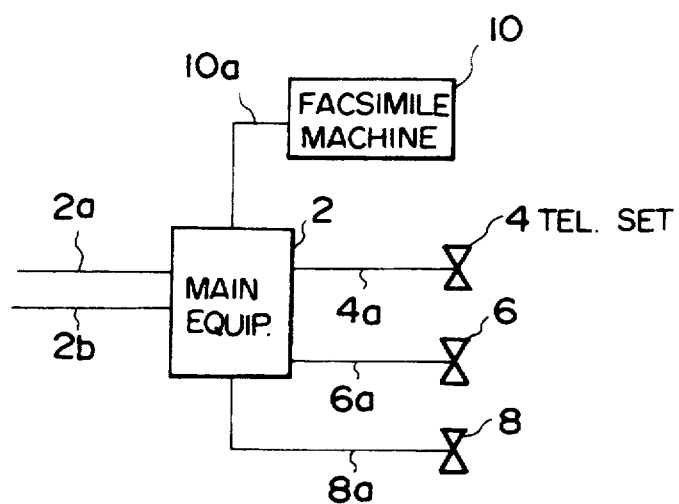
FIG. 5 is a block diagram of a conventional communication apparatus.

FIG. 1 illustrates a communication system according to the first embodiment, wherein two telephone lines 2a, 2b are connected to a communication line control unit 12, which, in the present embodiment, is integrally constructed with a facsimile apparatus (or another non-acoustic terminal unit). Thus the line control unit 12 serves as a line control unit of the facsimile apparatus and controls the telephone units 4, 6, 8 in the same manner as the main unit in FIG. 5. The entire range of functions of the telephone unit 4, including already known telephone and additional functions such as calling an external line, abbreviated dialing, on-hook dialing, hands-free conversation, extention-to-extention call, call transfer etc. are controlled, in the present embodiment, by the control unit of the facsimile apparatus.

The use of a common line control unit for the line control of the telephone units and the facsimile apparatus achieves the functional combination of the functions of the facsimile apparatus and telephone units as will be explained later, thereby enabling it to display information, obtained through facsimile communication, on a display device of the telephone unit or to control the function of the facsimile apparatus from a telephone unit.

Figure 2A:
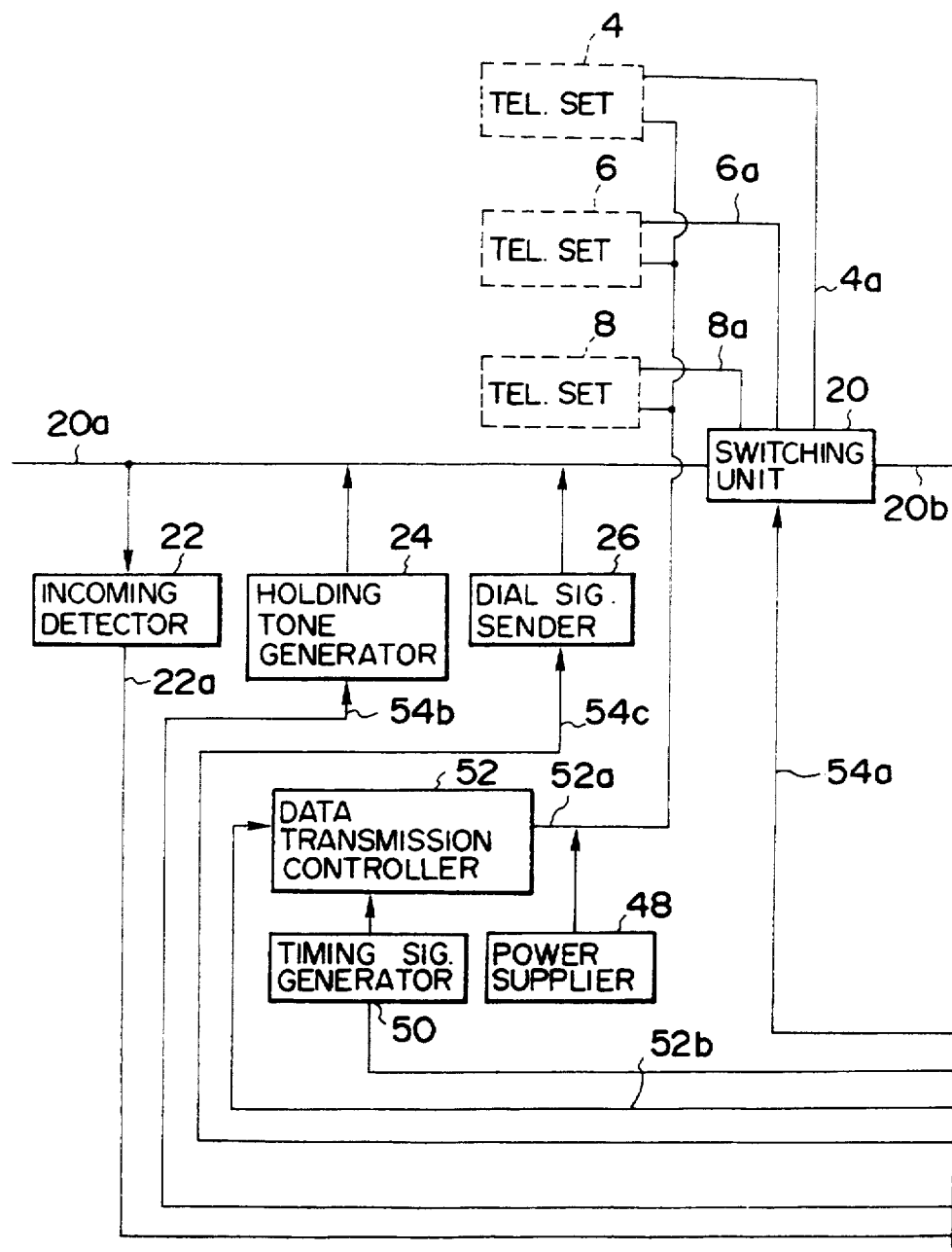
FIGS. 2A and 2B show a detailed block diagram of the first embodiment.
Figure 2B:
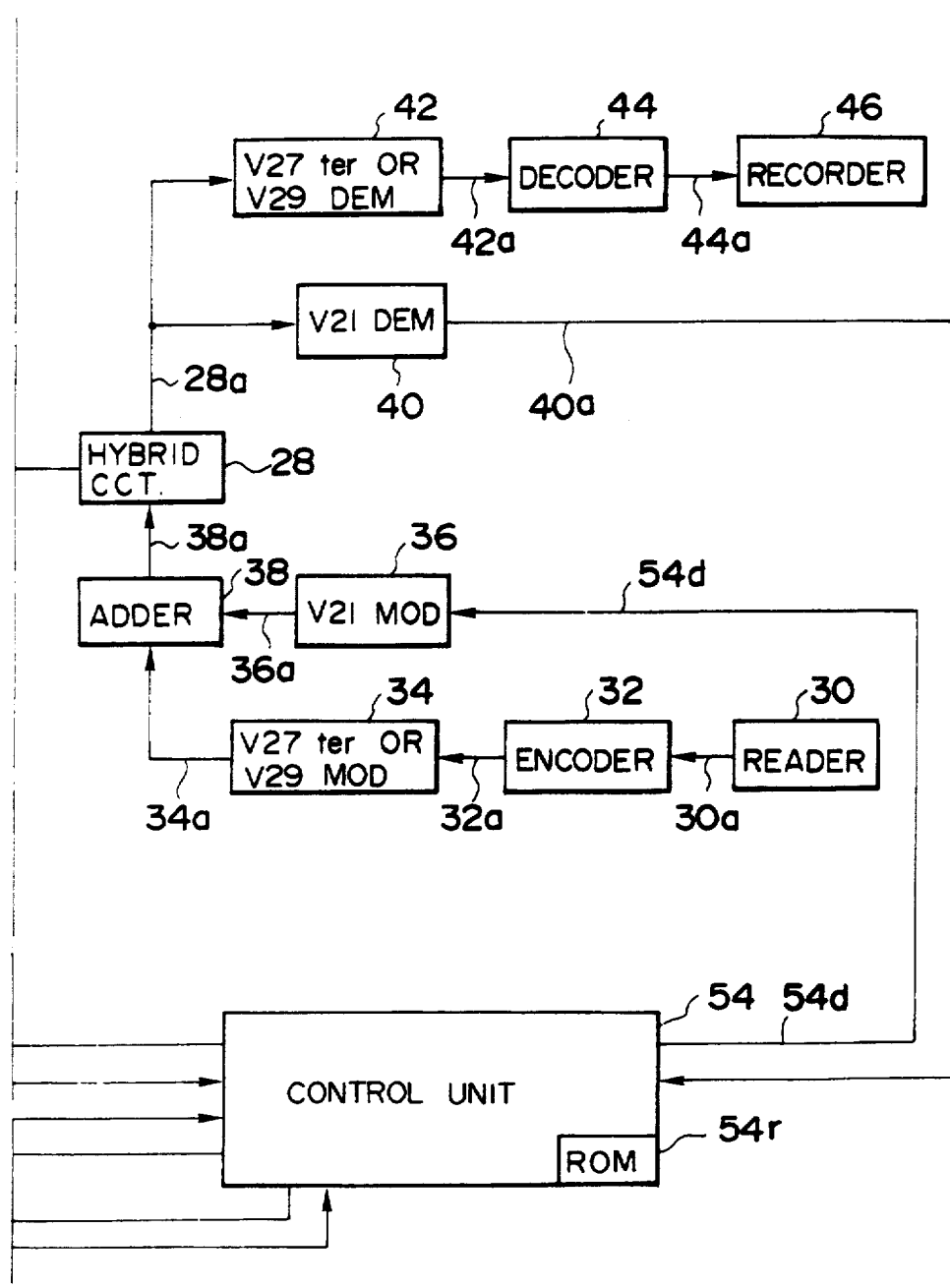

FIGS. 2A and 2B show the structure of the circuit of FIG. 1 in greater detail.

In FIG. 2A, a telephone line 20a is connected to a line switching unit 20 composed of analog switches etc.

To the line switching unit 20 are connected telephone units 4, 6, 8 constituting acoustic terminals, through signal lines 4a, 6a, 8a. As a non-acoustic terminal, a facsimile communication system starting from a hybrid circuit 28 is connected through a signal line 20b.

A control unit 54 controls the switching operation of the line switching unit 20 through a signal line 54a. More specifically it sends signal "0" to "3" to the line switching unit 20 to connect the line 20a to the hybrid circuit 28 or telephone unit 4, 6 or 8.

The control unit 54 controls the entire range of functions of the facsimile unit and the telephone units, according to a program stored in a ROM 54r, as will be explained later, and is composed of a microcomputer, a ROM 54r, a RAM, an I/O port etc.

The facsimile apparatus starting from the hybrid circuit 28 is composed in the following manner.

The hybrid circuit 28 connected to the line switching unit 20 through the signal line 20b is used for separating the received and transmission signals. The transmission signal is supplied through a signal line 38a, while the received signal is released through a signal line 28a. A transmission system is composed of an adder circuit 38 and an image transmission unit composed of elements 30, 32 and 34.

The adder 38 is used for adding a procedure signal and an image signal, supplied from modulators 36, 34 through signal lines 34a, 36a.

The modulator 36 modulates the procedure signal, supplied from the control unit 54 through a signal line 54b, by a process meeting the CCITT recommendation V21.

A reader circuit 30 is composed for example of a CCD image sensor, and sends the image signal thus read to an encoding circuit 32 through a signal line 30a. The encoding circuit 32, for redundancy suppression, compresses the image signal by a known encoding process such as MH (modified Huffman) encoding, and sends the compressed image signal to the modulator 34 through a signal line 32a.

The modulator 34 modulates the image signal according to a process meeting the CCITT recommendation v27er or v29.

On the other hand, a demodulator 40 connected to the signal line 28a demodulates the received procedure signal by a process corresponding to the above-mentioned modulator 36, and the demodulated procedure signal is supplied to the control unit 54 through a signal line 40a.

The received image signal is demodulated, decoded and recorded by a receiving unit indicated by 42, 44 and 46.

A demodulator 42 demodulates the image signal by a process corresponding to the modulation of the modulator 34 explained above, and the demodulated signal is supplied through a signal line 42a to a decoding circuit 44, which decodes the image signal by a process corresponding to the encoding in the encoding circuit 32. The decoded signal is supplied through a signal line 44a to a recording circuit 46, composed for example of a thermal printer.

The line control of the above-explained facsimile unit and the telephone units 4, 6, 8 is achieved by the control unit 54, through circuit blocks shown in FIG. 2A.

A circuit 22 for detecting an incoming call by a predetermined signal such as a call signal is connected to the line 20a, and the detection of an incoming call is reported through a signal line 22a to the control unit 54.

A circuit 24 generates an acoustic signal of holding tone to be transmitted to the destination station while the line is switched. A circuit 26 supplies the line 20a with a dial signal of predetermined type such as dialing tones or dialing pulses in calling a destination station. The holding tone generator 24 and dial signal sending circuit 26 are controlled by the control unit 54 respectively through signal lines 54b, 54c.

In FIG. 2A, the signal lines 4a, 6a, 8a are different from those in the aforementioned conventional example and are used for transmitting acoustic signals for telephone conversation. In the present embodiment the power supply to the telephone units 4, 6, 8 is achieved by a power supply circuit 48.

Also the data transmission for combined control of the telephone units 4, 6, 8 and the facsimile apparatus is controlled by a data transmission controller 52 composed for example of a PPI device. The data exchange between the data transmission controller 52 and the control unit 54 is conducted through a signal line 52b. On the other hand, the data transmission and the power supply between the telephone units 4, 6, 8 and the data transmission controller 52 are conducted through signal lines 52a. The data transmission controller 52 and the control unit 54 function in synchronization with clock pulses generated by a timing generator 50, composed for example of a clock generator.

FIG. 3 illustrates the structure of the telephone unit 4, 6 or 8, wherein the signal line 4a, 6a or 8a, connected to the line switching circuit 20 shown in FIG. 2, is connected to a line control circuit 70 for connecting the signal line to a telephone circuit 72, a signal tone generator 76 for generating a call tone, or a speaker circuit 78 used for example for hands-free conversation, respectively through a signal line 70b, 70a or 70c.

The telephone circuit 72 is composed of a noise protection circuit, a speech network etc. and is connected to a handset 74 through a signal line 72a.

On the other hand, the above-mentioned signal lines 52a for data transmission and power supply are connected to a power supply circuit 80 for supplying electric power to various circuit blocks of the telephone unit and to a data transmission controller 88, composed for example of a PPI device as explained before.

A control unit 92 composed for example of a microcomputer controls the functions of the entire telephone unit. The data transmission between the data transmission controller 88 and the control unit 92 is achieved through a signal line 90e.

A keyboard 84, having for example numeral keys for entering telephone numbers for making a call, is connected to the control unit 92 through a signal line 92c, and is further provided with start and stop keys for remote control of the facsimile apparatus.

For the purpose of displaying the entered telephone number or the data transferred from the facsimile apparatus through the signal lines 52a, a display unit 82, composed for example of a liquid crystal display device, is connected to the control unit 92 through a signal line 92b. The display unit 82 can also be used for monitoring the function of the facsimile apparatus, for example for displaying a telephone number or an abbreviation of the destination station obtained during a facsimile transmission. In this manner the display unit 82 can be used for the display of information relating to the function of the telephone unit and that relating to the function of the facsimile apparatus, and, for this purpose, there may be employed suitable display control such as dividing the display area of the display unit 82 or alternate displays.

Also connected, through a signal line 92d, is a lamp circuit 86 composed for example of an LED, for monitoring the operation of the telephone unit or the facsimile apparatus.

In the following there will be given an explanation on the function of the above-explained circuit while making reference to a flow chart shown in FIG. 4, indicating the control sequence of the control unit 54 in FIG. 2, stored as a program in the ROM 54r of the control unit 54.

The control unit 54 not only controls the communication of the facsimile apparatus and the operations of the telephone lines 4, 6, 8 but also effects data transmission with the facsimile apparatus when necessary, in order to combine the function of the telephone units with that of the facsimile apparatus.

Figure 4:
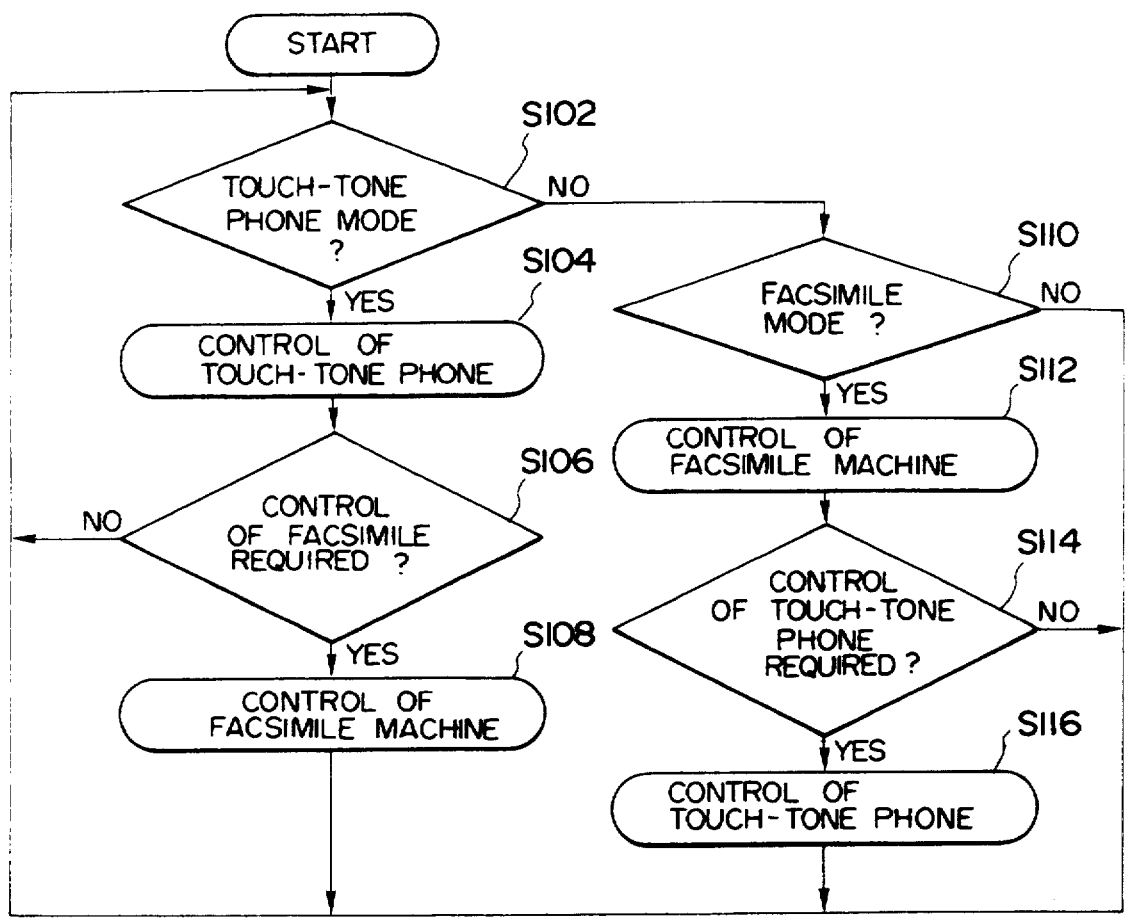
FIG. 4 is a flow chart showing control sequence of a control unit in the first embodiment.

Referring to FIG. 4, in a step S102, the control unit 54 discriminates, through the data transmission controller 52, the arrival of a signal indicating button actuations of the keyboard 84 from the telephone unit 4, 6 or 8. In response to an input through the keyboard 84 requiring a control such as a call, the control unit 92 of the telephone unit transfers the input data through the data transmission controller 88 and the signal lines 52a.

Then a step S104 controls the telephone unit according to the input data in the step S102, for example a call control through the dial signal sending circuit 26, or a connecting making of the telephone unit in case an incoming call is detected.

A succeeding step S106 discriminates whether the facsimile apparatus should be controlled according to the input data in the step S102. For example, if an instruction for starting or stopping the facsimile apparatus has been entered from the keyboard 84 of the telephone unit, a step S108 executes a corresponding control.

On the other hand, if the discrimination in the step S102 turns out negative, the sequence proceeds to a step S110 to discriminate whether a facsimile operation such as transmission, reception or original copying has been selected, by examining the input signal from an operation panel (not illustrated) of the facsimile apparatus.

If such input is absent the sequence returns to the step S102. If such input is present, a step S112 controls the various units of the facsimile apparatus according to the input, thereby effecting an operation such as transmission, reception etc. The information obtained during the facsimile operation is supplied, if necessary, to the telephone unit through the signal lines 52a for display on the display unit 82, or for enabling a control to continue or interrupt the communication operation through the keyboard 84 of the telephone unit.

A step S114 discriminates whether the control of the telephone unit 4, 6, 8 is required in relation to the facsimile communication. As an example, there is identified whether a call for the operator is required by a reserved conversation during the facsimile communication.

If such requirement occurs, the sequence proceeds to a step S116 to control the telephone units 4, 6, 8 through the signal lines 52a. For example, in case of a reserved conversation, the signal tone generator 76 (FIG. 3) is activated to call the operator. Also in such case, the telephone unit is controlled by sending or receiving commands through the signal lines 52a.

As explained in the foregoing, it is rendered possible to achieve line control for the telephone units and the facsimile apparatus by a common circuit instead of the separate circuits in the prior technology, thereby reducing the cost of the system. Also the conventionally separate functions of the facsimile apparatus and of the telephone units can be mutually combined, thereby enabling mutual information exchange for the purpose of information display or mutual control. Therefore the operator can control or monitor the function of the facsimile apparatus without going to the location of the facsimile apparatus.

In the foregoing explanation a facsimile apparatus is connected as a non-acoustic terminal together with the telephone units and a line control unit of the facsimile apparatus is employed for controlling the telephone units, but the same technology is applicable also when another data communication apparatus such as a personal computer is connected to the line.

In the following there will be explained a communication system constituting a second embodiment in which plural telephone units are connected to a facsimile apparatus and in which the operation of the facsimile apparatus can be controlled from the telephone units.

Figure 6A:
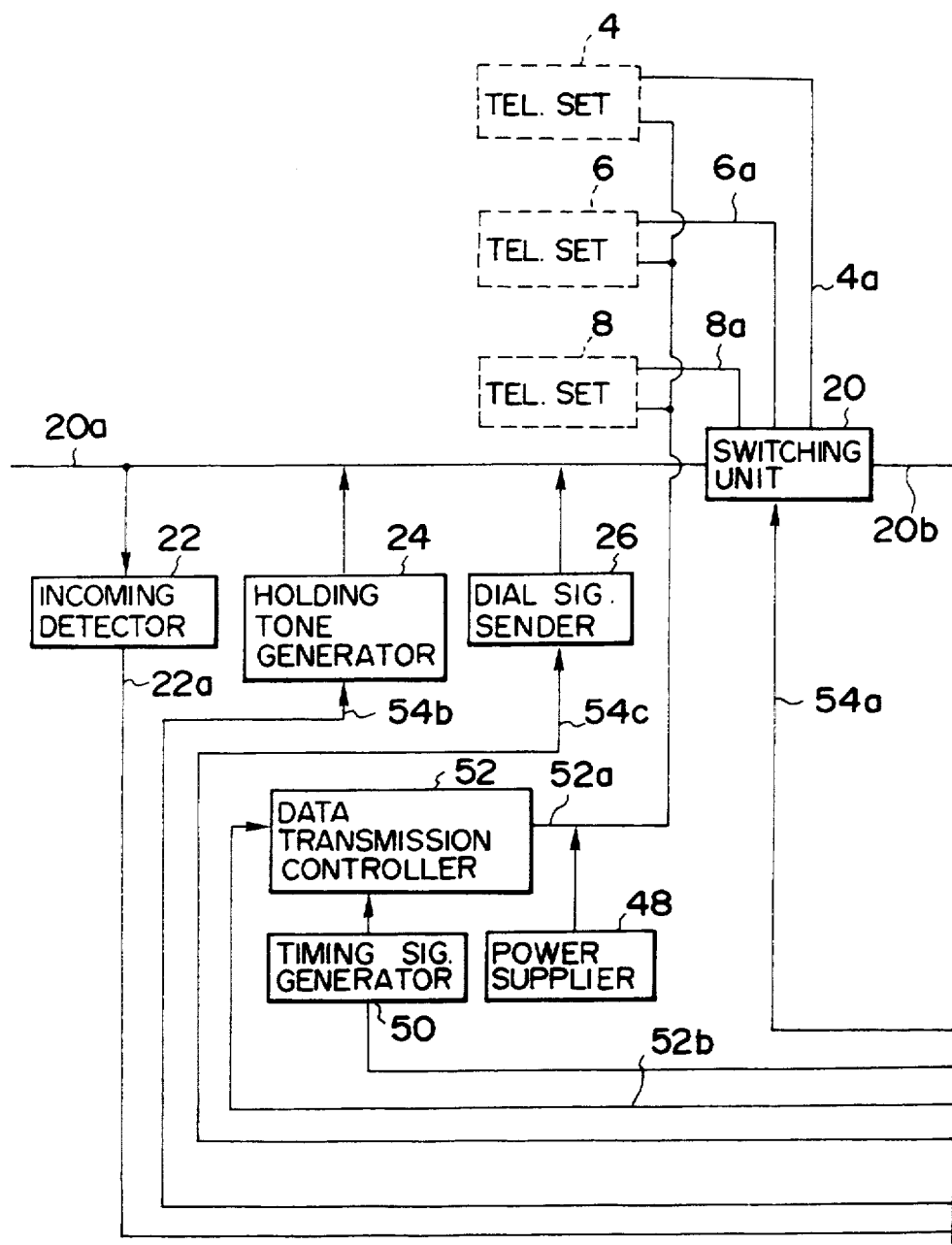
FIGS. 6A and 6B show a block diagram of a second embodiment of the communication apparatus.
Figure 6B:
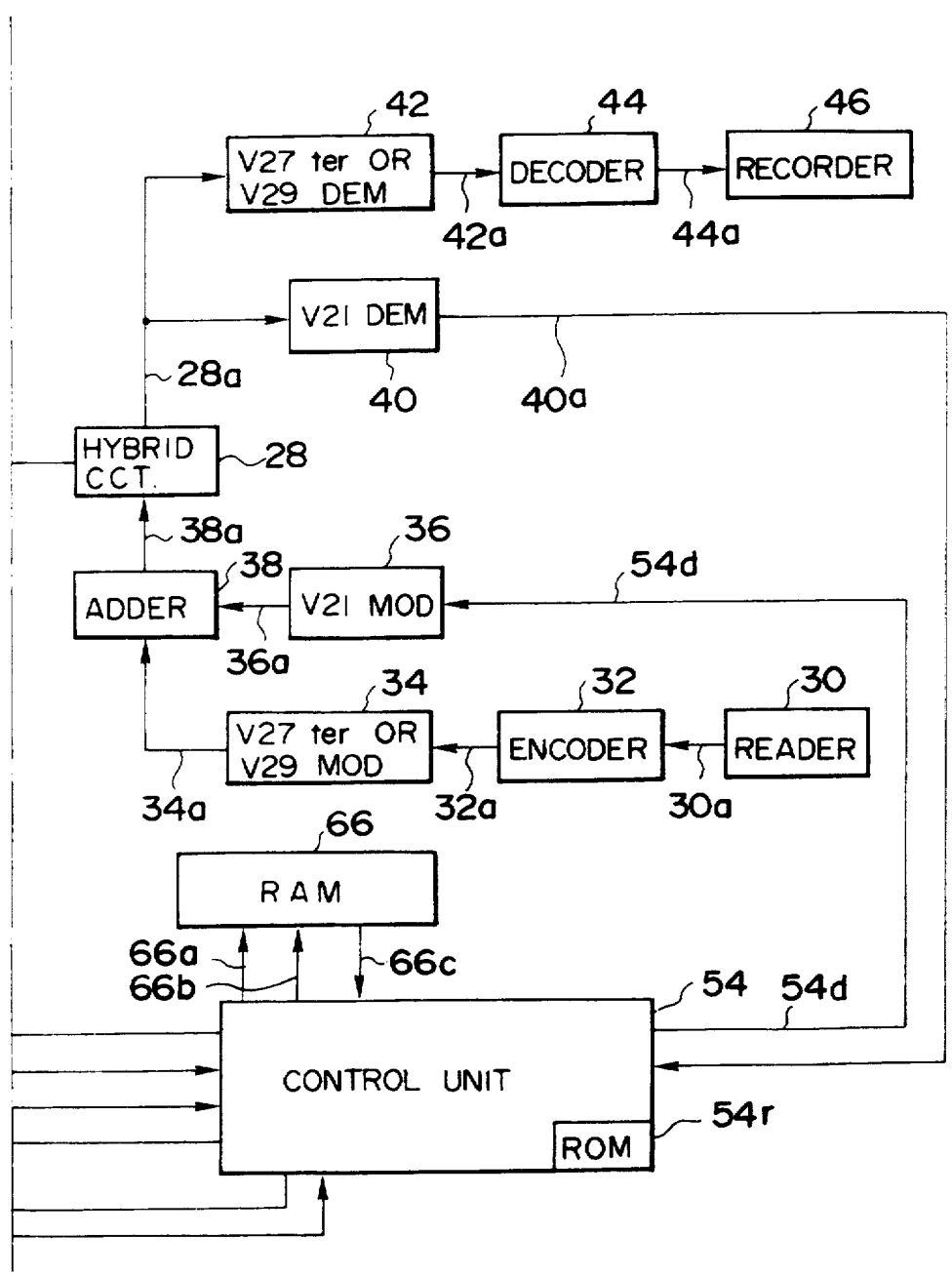

FIGS. 6A and 6B illustrates the structure of the second embodiment. In FIGS. 6A, 6B and 7, same components as those in FIGS. 2A, 2B and 3 are represented by same numbers. A telephone line 20a is connected to a line switching circuit 20 composed for example of analog switches.

Telephone units 4, 6, 8 are connected as acoustic terminals to the line switching circuit 20 respectively through signal lines 4a, 6a, 8a. Also a facsimile communication system, starting from a hybrid circuit 28, is connected as a non-acoustic terminal through a signal line 20b.

A control unit 54 of the facsimile apparatus controls, through signal lines 54a, the entire range of functions of the telephone units, including known conversational and additional functions, such as outside calling, abbreviated dialing, on-hook dialing function, hards-free conversation, extension-to-extension call, transfer function etc.

The control unit 54 controls the switching operation of the line switching unit 20 through the signal line 54a. More specifically it sends signals "0" to "3" to the line switching unit 20 to connect the line 20a to the hybrid circuit 28 or telephone unit 4, 6 or 8.

The control unit 54 controls the entire range of functions of the facsimile apparatus and the telephone units, according to a program stored in a ROM 54r as will be explained later.

The facsimile apparatus starting from the hybrid circuit 28 is constructed in the following manner.

The hybrid circuit 28 connected to the line switching unit 20 through the signal line 20b is used for separating the received and transmitted signals. The transmission signal is supplied through a signal line 38a, while the received signal is released through a signal line 28a. A transmission system is composed of an adder circuit 38, an modulator 36 and an image transmission unit composed of elements 30, 32, 34.

The adder 38 is used for adding a procedure signal and an image signal, supplied from modulators 36, 34 through signal lines 36a, 34a.

The modulator 36 modulates the procedure signal, supplied from the control unit 54 through a signal line 54d, by a process meeting the CCITT recommendation v21.

A reader circuit 30 is composed for example of a CCD image sensor, and sends the image signal thus read to an encoding circuit 32 through a signal line 30a. The encoding circuit 32, for redundancy suppression, compresses the image signal by a known encoding process such as MH (modified Huffman) encoding, and sends the compressed image signal to the modulator 34 through a signal line 32a.

The modulator 34 modulates the image signal according to a process meeting the CCITT recommendation v27ter or v29.

On the other hand, the demodulator 40, connected to the signal line 28a demodulates the received procedure signal by a process corresponding to that of the above-mentioned modulator 36, and the demodulated signal is supplied to the control unit 54 through a signal line 40a.

The received image signal is demodulated, decoded and recorded by a receiving unit indicated by elements 42, 44, 46.

A demodulator 42 demodulates the image signal by a process corresponding to the modulation of the modulator 34 explained above, and the demodulated signal is supplied through a signal line 42a to a decoding circuit 44, which decodes the image signal by a process corresponding to the encoding in the encoding circuit 32. The decoded signal is supplied through a signal line 44a to a recording circuit 46, composed for example of a thermal printer.

The line control of the above-explained facsimile apparatus and the telephone units 4, 6, 8 is achieved by the control unit 54, through circuit blocks shown in the left-hand half in FIG. 6A.

A circuit 22 for detecting an incoming call by a predetermined signal such as a call signal is connected to the line 20a, and the detection of an incoming call is reported through a signal line 22a to the control unit 54.

A circuit 24 generates an acoustic signal of holding tone to be transmitted to the destination station while the line is switched. A circuit 26 supplies the line 20a with a dial signal of predetermined type such as dialing tones or dialing pulses in calling a destination station. The holding tone generator 24 and dial signal sending circuit 26 are controlled by the control unit 54 respectively through signal lines 54b, 54c.

In FIG. 7, the signal lines 4a, 6a, 8a are different from those in the aforementioned conventional example and are used for transmitting acoustic signals for telephone conversation. In the present embodiment the power supply to the telephone units 4, 6, 8 is achieved by a power supply circuit 48.

Also the data transmission for combined control of the telephone units 4, 6, 8 and the facsimile apparatus is controlled by a data transmission controller 52 composed for example of a PPI device. The data exchange between the data transmission controller 52 and the control unit 54 is conducted through a signal line 52b. On the other hand, the data transmission and the power supply between the telephone units 4, 6, 8 and the data transmission controller 52 are conducted through signal lines 52b. The data transmission controller 52 and the control unit 54 function is in synchronization with clock pulses generated by a timing generator 50, composed for example of a clock generator.

The facsimile apparatus shown in FIGS. 6A and 6B is equipped, in addition to the ROM 54r, with a RAM 66 for storing various parameters required in the facsimile communication, such as telephone numbers necessary for making calls, telephone number of the destination or of this system, software switch information for selecting various communication modes such as an image communication mode etc. These data will be hereinafter called communication parameters.

In the present embodiment the communication parameters can be entered not only from the operation panel of the facsimile apparatus but also from the keyboard of the telephone unit 4, 6 or 8. The communication parameters entered from the telephone unit 4, 6 or 8 are transferred through the signal line 52a and received, through the data transmission controller 52, by the control unit 54, which stores thus received communication parameters in the RAM 66 through signal lines 66a–66c.

The signal line 66a is used for input of readout pulses to the RAM 66, while the signal line 66b is used for input of write-in pulse to the RAM 66, and the signal line 66c is used for data exchange between the control unit 54 and the RAM 66. The read-out pulses on the signal line 66a are used not only when the control unit 54 utilizes the data in the RAM 66 but also in monitoring or confirming the data from the telephone unit 4, 6 or 8 at the entry therefrom.

FIG. 7 illustrates the structure of the telephone unit 4, 6 or 8 wherein the signal line 4a, 6a or 8a, connected to the line switching circuit 20 shown in FIG. 6, is connected to a line control circuit 70 for connecting the signal line to a telephone circuit 72, a signal tone generator 76 for generating a call tone, or a speaker circuit 78 used for example for hands-free conversion, respectively through a signal line 70b, 76a or 70c.

The telephone circuit 72 is composed of a noise protection circuit, a speech network etc. and is connected to a handset 74 through a signal line 72a.

On the other hand, the above-mentioned signal lines 52a for data transmission and power supply are connected to a power supply circuit 80 for supplying electric power to various circuit blocks of the telephone unit and to a data transmission controller 88, composed for example of a PPI device as explained before.

A control unit 92 composed for example of a microcomputer controls the functions of the entire telephone unit. The data transmission between the data transmission controller 88 and the control unit 92 is achieved through a signal line 90e.

A keyboard 84, having for example numeral keys for entering telephone numbers for making a call is connected to the control unit 92 through a signal line 92c, and is further provided with start and stop keys for remote control of the facsimile apparatus.

For the purpose of displaying the entered telephone number or the data transferred from the facsimile apparatus through the signal lines 52a, a display unit 82, composed for example of a liquid crystal display device, is connected to the control unit 92 through a signal line 92b.

The display unit 82 can also be used for monitoring the function of the facsimile apparatus, for example for displaying a telephone number or an abbreviation of the destination station obtained during a facsimile transmission, through the signal lines 52a.

In this manner the display unit 82 can be used for the display of information relating to the function of the telephone unit and that relating to the function of the facsimile apparatus, and, for this purpose, there may be employed suitable display control such as dividing the display area of the display unit 82 or alternate displays.

Thus the display unit 82 can be used not only in the transfer of the communication parameters to the RAM 66 of the facsimile apparatus but also for displaying ID data or telephone number of the destination station, obtained during a facsimile communication, at a location distant from the facsimile apparatus.

Also connected, through a signal line 92d, is a lamp circuit 86 composed for example of an LED, for monitoring the operation of the telephone unit or the facsimile apparatus.

Figure 8:
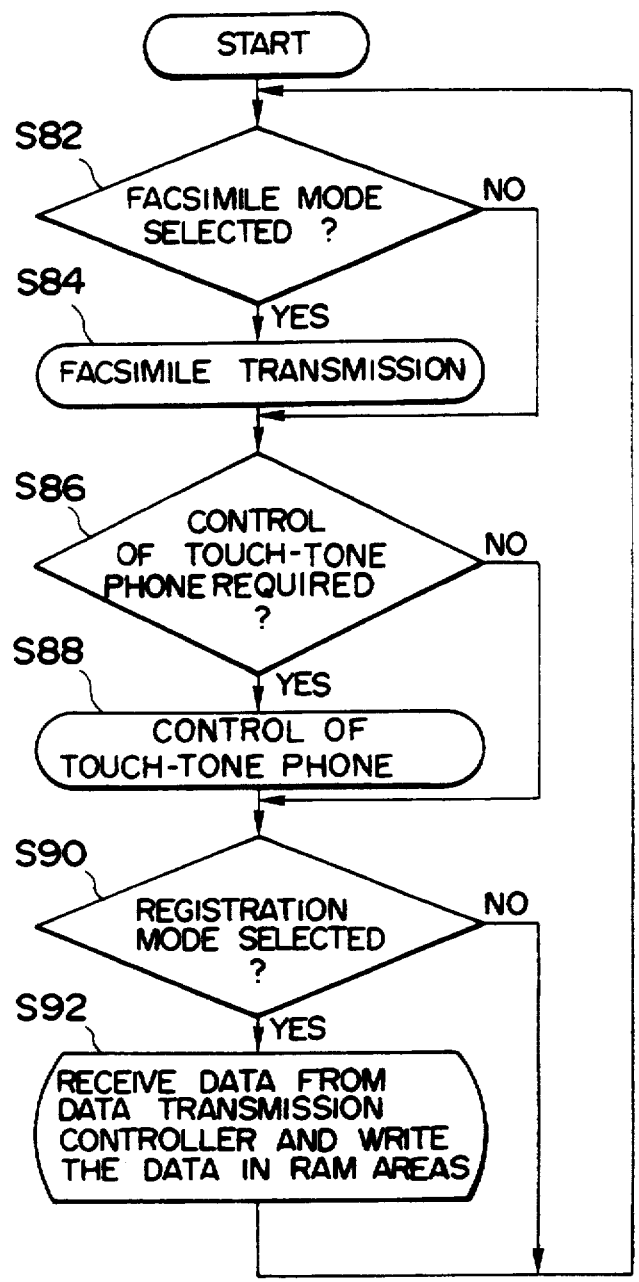
FIG. 8 is a flow chart showing control sequence of a control unit of the second embodiment.

In the following there will be given an explanation on the function of the above-explained circuit while making reference to a flow chart shown in FIG. 8, indicating the control sequence of the control unit 54 in FIG. 6B, stored as a program in the ROM 54r of the control unit 54.

The control unit 54 not only controls the communication of the facsimile apparatus and the operations of the telephone units 4, 6, 8 but also effects data transmission with the facsimile apparatus when necessary, in order to combine the function of the telephone units with that of the facsimile apparatus. This control includes the input of communication parameters from the telephone unit, and the monitoring of the facsimile communication from the telephone unit.

At first a step S82 discriminates whether a facsimile operation such as image transmission or reception has been selected, by examining the input signal of an operation panel (not illustrated) of the facsimile apparatus.

If such input is absent, the sequence jumps to a step S86, but, if present, a step S84 controls the various units of the facsimile apparatus according to the input thereby effecting image transmission. The information obtained during the facsimile operation is supplied, if necessary, to the telephone unit through the signal lines 52a for display on the display unit 82. There is also accepted a control for continuing or interrupting the communication through the keyboard 84 of the telephone unit 4, 6 or 8.

A step S86 after the facsimile communication discriminates the presence of input control, indicating for example a call from the telephone unit 4, 6 or 8. More specifically the control unit 54 examines, through the data transmission controller 52, the arrival of a signal indicating button operations of the keyboard 84 of the telephone unit 4, 6 or 8. In the presence of an input from the keyboard 84 requiring a control such as making a call, the control unit 92 of the telephone unit transfers the input data through the data transmission controller 88 and the signal line 52a.

If the discrimination of the step S86 turns out affirmative, a step S88 controls the telephone unit according to the input in the step S102, such as a call control utilizing the dial signal sending circuit 26, or a connection to a telephone unit if an incoming call is detected.

On the other hand, if the discrimination of the step S86 turns out negative, a step S90 discriminates whether there has been selected registration of communication parameters from the keyboard 84 of the telephone unit to the RAM 66 of the facsimile apparatus, by examining the data transferred from the telephone unit, through the data transmission controller 52.

If the discrimination of the step S90 turns out affirmative, a step S92 receives, through the transmission controller 52, the communication parameters transferred from the telephone unit 4, 6 or 8 through the signal lines 52a, and stores the parameters in a predetermined area of the RAM 66 through the signal lines 66a-66c, for utilization in the succeeding facsimile communication. At the entry and transfer of the communication parameters from a telephone unit, in order to enable the operator to properly monitor the input operation, necessary information may be fed back to the telephone unit through the data transmission controller 52.

As explained in the foregoing, it is rendered possible to achieve line control for the telephone units and the facsimile apparatus by a common circuit instead of the separate circuits in the prior technology, thereby reducing the cost of the system.

Also the conventionally separate functions of the facsimile apparatus and of the telephone units can be mutually combined, thereby enabling mutual information exchange for the purpose of information display or mutual control. Therefore the operator can control or monitor the function of the facsimile apparatus without going to the location of the facsimile apparatus.

In particular, the present embodiment provides an advantage of registration of communication parameters, such as a telephone number required in the facsimile communication, an abbreviation of user name, software switch information etc. from the telephone units. The registration of such communication parameters has had to be conducted through the operation unit of the facsimile apparatus which is usually located in a relatively inconvenient place, such as a corner of an office, but it can now be made through a more conveniently located telephone unit, for example on the desk of the operator.

In the foregoing explanation a facsimile apparatus is connected as a non-acoustic terminal together with the telephone units and a line control unit of the facsimile apparatus is employed for controlling the telephone units, but the same technology is applicable also when another data communication apparatus such as a personal computer is connected to the line.

Figure 9:
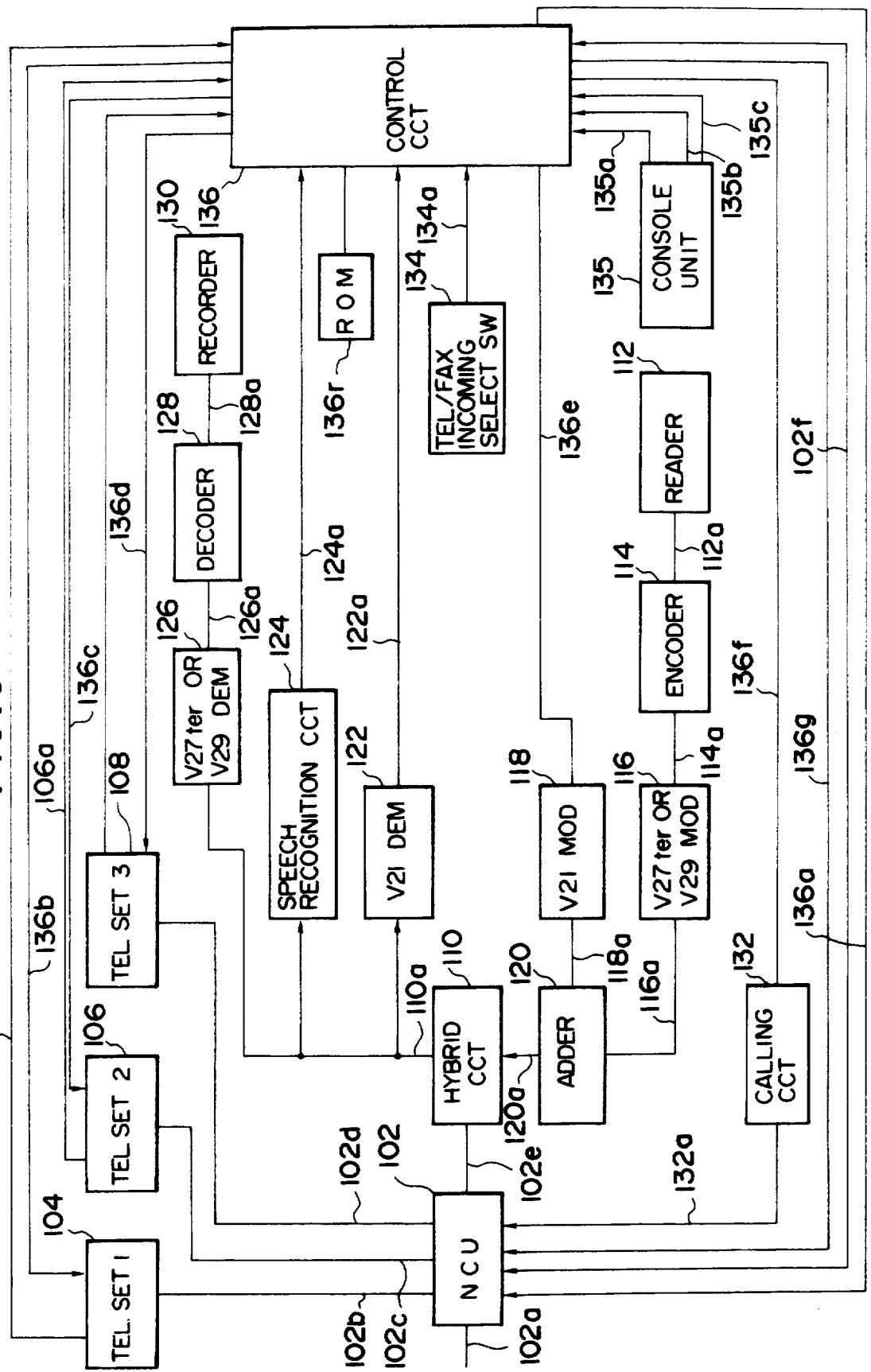
FIG. 9 is a block diagram of a third embodiment of the communication apparatus.

In the following there will be explained a communication system constituting a third embodiment in which plural telephone units are connected to a facsimile apparatus, in case of an automatic calling or a response to an incoming call. FIG. 9 is a block diagram of the third embodiment.

In FIG. 9, a telephone line 102a is connected to an NCU 102, to which connected are three telephone units 104, 106, 108 as acoustic terminals, respectively through signal lines 102b, 102c, 102d. Also connected, as a non-acoustic terminal, is a facsimile communication system starting from a hybrid circuit 110, through the signal line 102e.

A control circuit 136 controls the switching operation of the NCU 102 by sending signals "0"-"3" through a signal line 136a, thereby connecting the line 102a to the hybrid circuit 110, telephone unit 104, 106 or 108 according to the signal.

The telephone units are connected to a control circuit 136 through signal lines 104a, 106a, 108a and 136b-136d. The signal lines 104a, 106a, 108a identify the hook state of the telephone units, wherein logic levels "0" and "1" respectively indicate an on-hook state and an off-hook state.

The signal lines 136b-136d activate bell circuits of the telephone units.

In response to an incoming call, a selector switch 134 determines whether a facsimile apparatus or a telephone unit is to be preferentially connected to the line. According to the selection by the operator the selector switch 134 supplies the control circuit 136 with a signal "0" (facsimile) or "1" (telephone) through a signal line 134a, thereby designating the equipment to be connected.

The facsimile apparatus starting from the hybrid circuit 110 is composed as follows.

At first, the hybrid circuit 110, connected to the NCU 102 through a signal line 102e, is used for separating the transmitted and received signals. The transmission signal is entered through a signal line 120a, while the received signal is released through a signal line 110a. A transmission system is composed of an adder 120, modulators 116, 118, a reader circuit 112 and an encoding circuit 114.

The adder 120 is used for adding an image signal and a procedure signal supplied from the modulators 118, 116 through signal lines 116a, 118a. The modulator 118 modulates a communication procedure signal, entered from the control circuit 136 through a signal line 136e, according a process meeting the CCITT recommendation v21. The modulator 116 modulates the image signal according to a process meeting the CCITT recommendation v27ter or v29.

The image signal is read by the reader circuit 112 composed for example of a CCD sensor, then subjected to redundancy suppression in the encoding circuit 114 by MH or MR encoding, and supplied to the modulator 116.

On the other hand, a demodulator 122 connected to the signal line 110a demodulates the received procedure signal by a demodulating process meeting the CCITT recommendation v21, and the demodulated procedure signal is supplied to the control unit through a signal line 122a.

The received image signal is demodulated by a demodulator 126 according to a demodulation process corresponding to the modulation in the above-mentioned modulator 116, and is then supplied through a signal line 126a to a decoder 128, which decodes the image signal according to a decoding process corresponding to the encoding in the encoding circuit 114. Obtained binary data are supplied, through a signal line 128a, to a recording circuit 130 composed for example of a thermal printer.

In the present embodiment, a speech recognition circuit 124 is connected to the signal line 110a for automatically effecting acoustic communication when a voice signal is detected in the received signal. In response to a voice detection, a detection signal is supplied to the control circuit 136 through a signal line 124a. The speech recognition circuit can be composed of known frequency discrimination circuits etc.

The telephone units and the facsimile apparatus utilize a common calling circuit 132 for making calls. The calling circuit 132 receives telephone number data from the control circuit 136 through a signal line 136f, and supplies dial signals such as dialing pulses or dialing tones suitable for the telephone line, to the NCU 102 through a signal line 132a. The timing of calling is given by the control circuit 136 through a signal line 136g.

The function of the apparatus is controlled by an operation unit 135 composed of display devices, and a keyboard. The keyboard is provided with alphabet keys, numeral keys and a start key, and the data of these three categories are supplied to the control circuit 136 respectively through signal lines 135a-135c.

The control circuit 136 is composed of a microprocessor, a RAM etc., and controls the functions of the entire apparatus according to a control program stored in a ROM 136r.

In the following there will be explained the function of the above explained apparatus.

In the present embodiment, when a destination station is called, the control is switched according to whether the station is an acoustic terminal or a non-acoustic terminal. Flow charts in FIGS. 10 and 11 show control procedures for the control, executed by the control circuit 136 and stored as a program in the ROM 136r.

Figure 10:
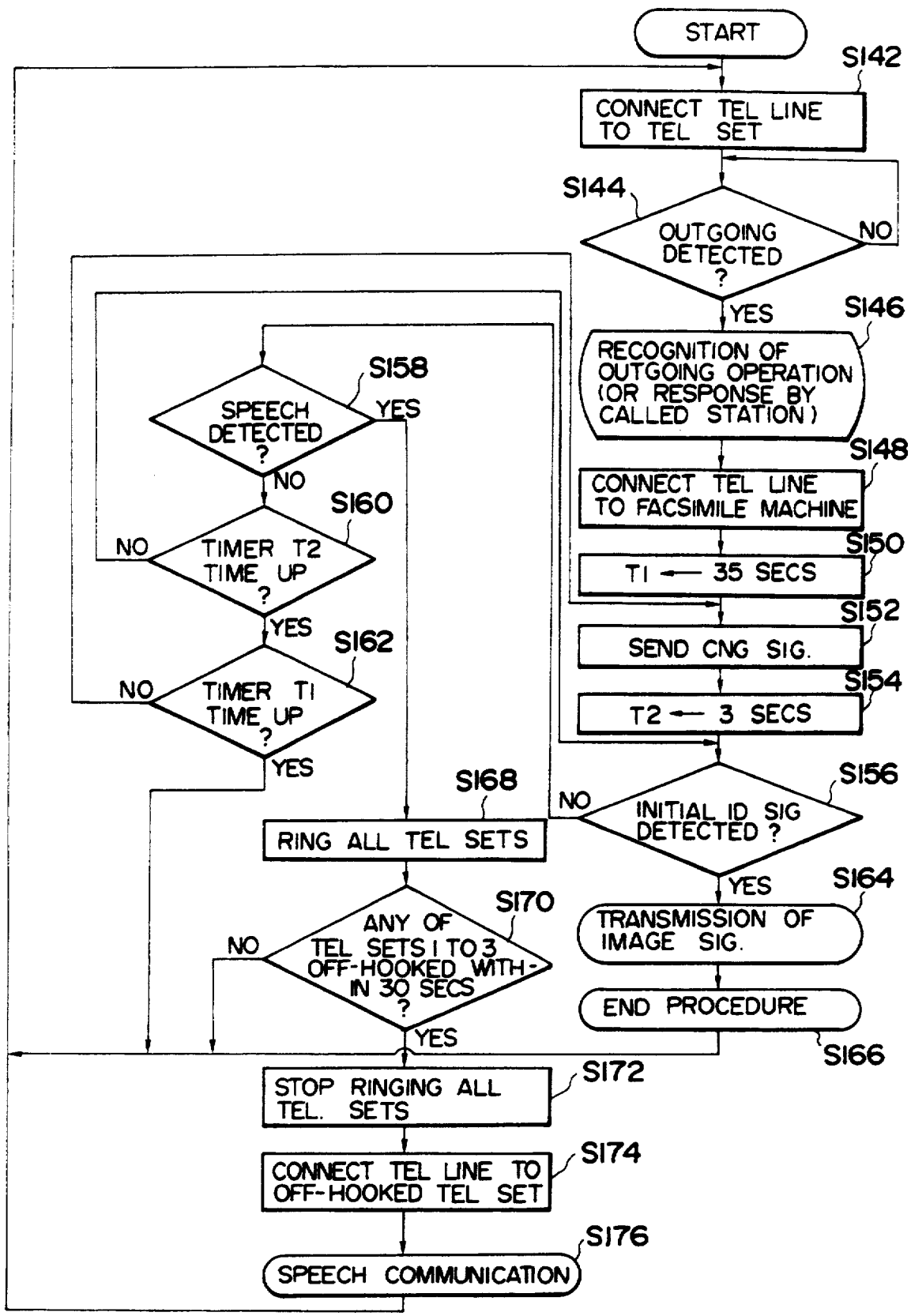
FIG. 10 is a flow chart showing control sequence of a control unit of the third embodiment.
Figure 11:
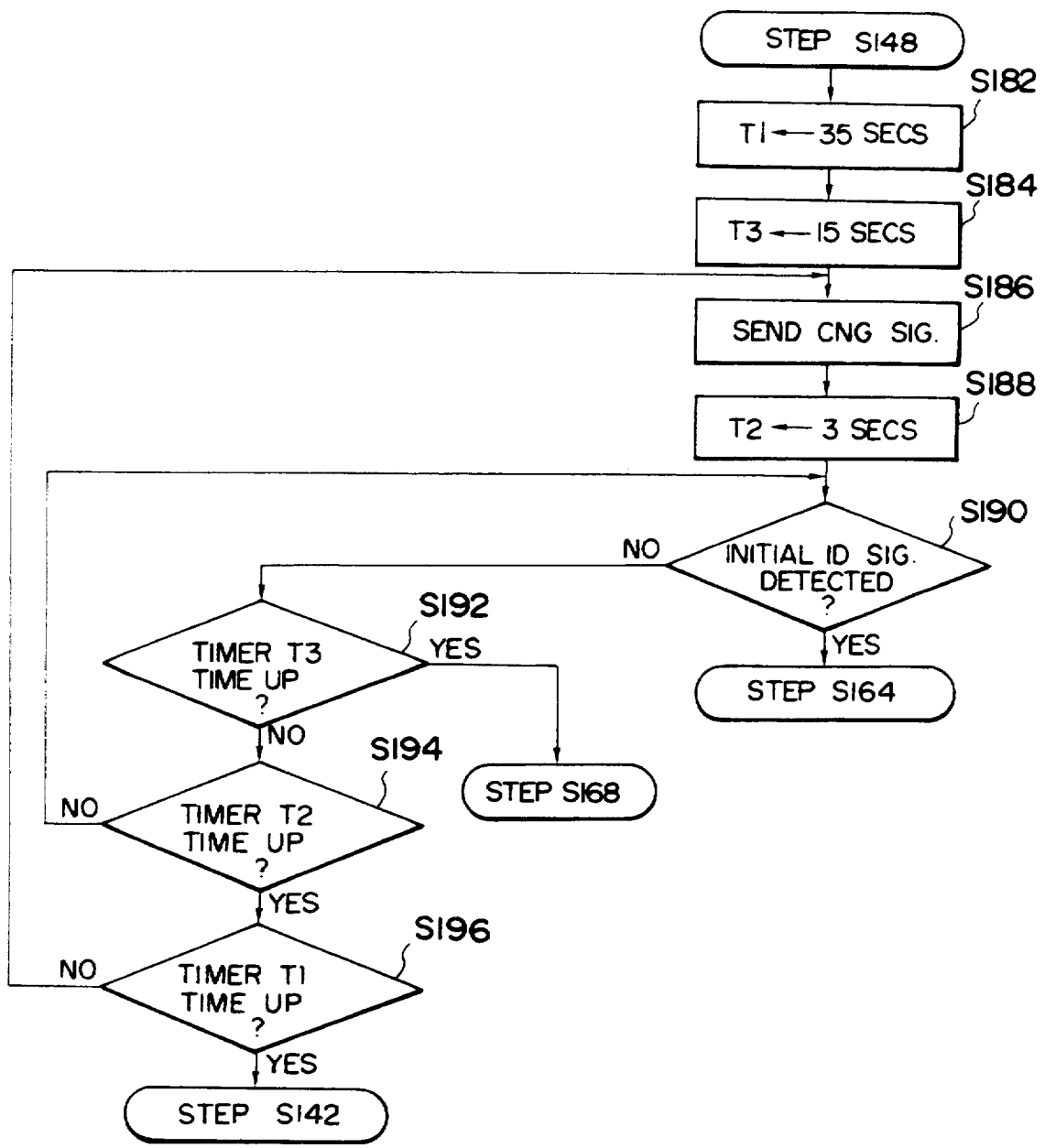
FIG. 11 is a flow chart showing a variation of the control sequence shown in FIG. 10.

In the sequence shown in FIG. 10, the control is switched by detecting a voice signal from the destination station.

At first, in a step S142 in FIG. 10, the control circuit 136 connects the telephone line 102a to the first telephone unit 104 by supplying a signal "0" to the signal line 136a and thereby causing the NCU 103 to effect corresponding connection control.

Then a step S144 discriminates whether a transmission by the facsimile apparatus has been selected, by detecting the inputs to the operation units 135, through the signal lines 135a-135c.

Then a step S146 activates the calling circuit 132 to general dial signals, thereby calling a destination station.

Response by the station is detected by the inversion of polarity of the telephone line.

A step S148 then switches the telephone line to the facsimile apparatus, by supplying a signal "3" to the signal line 136a and thereby causing the NCU 103 to connect the line 102 to the line 102e.

A step S150 sets a period of 35 seconds corresponding to the initial identification signal detecting time in a facsimile communication protocol in a timer T1 composed of a software or a hardware device, and activates the timer.

A step S152 transmits a signal CNG indicating an automatic transmission. Then a step S154 sets 3 seconds in a timer T2 and activates the timer.

A loop consisting of steps S156, S158 and S160 detect the initial identification signal of the destination station, the voice signal and the lapse of 3 seconds measured by the timer T2. The initial identification signal is detected by the demodulator 122, while the voice signal is detected by the speech recognition of circuit 124.

If the step S156 detects the initial identification signal in a facsimile protocol such as a destination identification signal, steps S164 and S166 execute image signal transmission and a post-procedure, and the sequence returns to the step S142. The image signal to be transmitted is read in the reader circuit 112, then encoded in the encoding circuit 114 and modulated in the modulator 116 and transmitted through the NCU 102. The post-procedure is conducted by the control circuit 136 through the modulator 118 and the demodulator 122.

On the other hand, if a voice signal is received from another station, the sequence proceeds to a step S168. The loop of the steps S156, S158 and S160 is repeated unless the lapse of 3 seconds is confirmed in the step S160.

A step S162 detects the lapse of 35 seconds by the timer T1. Until the expiration of a period of 35 seconds, a loop of the steps S152 to S162 is repeated to execute the transmission of the CNG signal and the detections of initial identification signal and voice signal.

If the step S158 detects a voice signal, the sequence proceeds to the step S168 to send a command to the telephone units 104, 106, 108 through the signal lines 136b–136d, thus activating the bell circuits of all the telephone units.

A step S170 then discriminates the hook state of the telephone units through the signal lines 104a, 106a, 108a, of which level is shifted to "1" in an off-hook state. If the hook is turned off in any of the telephone units within 30 seconds, indicating a response by the operator, the sequence proceeds to a step S172. If there is no response by the operator within 30 seconds, the sequence returns to the step S142.

The step S172 deactivates the bell circuits of the telephone units through the signal lines 136b–136d. A succeeding step S174 controls the NCU 102 through the signal line 136a to connect the telephone line 102a to the responding telephone unit, and a step S176 enables conversation between the operators.

As explained in the foregoing, the present embodiment either effects a facsimile communication if the facsimile apparatus of the destination station responds by an initial identification signal, or, if the operator of the station responds by a telephone unit, activates the bells of the telephone units to enable conversation between the operators.

FIG. 11 shows a sequence for activation the telephone units to enable conversation between the operators when a voice signal is not detected and an initial identification signal is not detected for a predetermined period.

The procedure shown in FIG. 11 is inserted in place of the steps S150 to S162 in FIG. 10. There is employed a timer T3 of 15 seconds, in addition to the timers T1, T2.

In the embodiment shown in FIG. 11, the sequence proceeds to a step S182 after the step S148 in FIG. 10. Steps S182 and S184 set 35 seconds and 15 seconds in the timers T1 and T3, and start these timers.

A step S186 transmits the CNG signal, and a step S188 sets 3 seconds in the timer T2 and starts the same.

A step S190 detects an initial identification signal from the destination station, and, if the signal is detected, the sequence proceeds to a step S164 in FIG. 10 to effect image transmission.

Steps S192, S194 and S196 respectively detect expiration of the timers T3, T2 and T1. If the initial identification signal cannot be received within 15 seconds in the step S192, the other station is identified as an acoustic terminal, and the sequence proceeds to a step S168 to activate the telephone units thereby calling the operator.

If the step S194 does not detect the lapse of 3 seconds, the sequence returns to the step S190 to detect the initial identification signal. On the other hand, if a period of 35 seconds has not elapsed in the step S196, the sequence returns to the step S186 to repeat the above-explained procedure starting from the transmission of the CNG signal. If the step S196 detects the lapse of 35 seconds, the sequence returns to the step S142 shown in FIG. 10.

The above-explained structure allows further simplification of the system since a control as in FIG. 10 can be achieved without voice detection.

In the above-explained structure, if the other station is an acoustic terminal, a predetermined voice message may be transmitted while the bell circuits of the telephone units are activated to call the operator. The voice message can be generated by a tape recorder or a PCM recording circuit.

Although the foregoing descriptions are limited to the cases of facsimile transmission after making a call, there may also be conducted facsimile reception. Also the apparatus connected to the telephone line together with the telephone units is not limited the facsimile apparatus but can be various communication apparatus of various communication processes.

In case of reception, the control circuit 136 discriminates whether the NCU 102 has detected a call signal from the line 102a, on behalf of the steps S144 and S146 in FIG. 10, and, upon detection of the call signal, connects the line 102a to the facsimile apparatus in a step S148. Then a step S150 sets 35 seconds in the timer T1, and a step S152 supplies the line 102a with a signal CED indicating that the called station is a non-acoustic terminal (or a speech message indicating a facsimile apparatus), instead of the CNG signal, and a digital identification signal (DIS) constituting a facsimile communication procedure signal.

Then a step S154 sets 3 seconds in the timer T2, then a step S156 discriminates the detection of a digital command signal DCS instead of the detection of the initial identification signal, and, if the DCS signal is not detected, the sequence proceeds to a step S158. On the other hand, if the DCS signal is detected, a step S164 executes the remaining facsimile communication procedure (pre-procedure) instead of the image transmission and executes reception. Other steps are same in the transmission and reception.

In this manner a response can be achieved according to the destination station as in the transmission.

Furthermore the present invention is not limited to the foregoing embodiments but is subject to various modifications.

What is claimed is:

1. A communication system comprising:
a plurality of telephone sets, each of said plurality of telephone sets comprising a keyboard and a display;
connecting means for connecting a selected one of data communication means and said telephone sets to a communication line, said data communication means performing an image data communication;
storage means for storing therein communication information for a data communication of said data communication means, the communication information being transmitted by said plurality of telephone sets according to an operation of one of said keyboards; and
control means for controlling said plurality of telephone sets such that said plurality of telephone sets perform display according to said communication means.

2. An apparatus according to claim 1, wherein the communication information includes a telephone number.

3. A system according to claim 1, wherein said data communication means encodes a read image signal into encoded image data and transmits the encoded image data.

4. A system according to claim 1, wherein said data communication means performs a facsimile communication.

5. A system according to claim 1, wherein said plurality of telephone sets perform a speech communication through a plurality of speech communication channels, said connecting means and the communication line, and a registration means registers into said storage means the communication information received from said telephone sets through a plurality of control channels.

6. A system according to claim 1, wherein said control means controls said telephone sets such that said telephone sets display information obtained by said data communication means in the data communication.

7. A telephone system comprising:
a plurality of telephone sets;
switch means for connecting a selected one of data communication means and said plurality of telephone sets to a single communication line, said data communication means performing an image data communication;
identification means for identifying whether a communication partner connected to said communication line is another data communication means or another telephone set, by discriminating whether or not a data-communication procedure signal is received from said communication line; and
control means for controlling, when said identification means identifies that said communication partner is another telephone set, said plurality of telephone sets such that each of said plurality of telephone sets respectively is informed of a speech communication request, wherein said control means controls said switch means such that said switch means connects said communication line to one of said telephone sets responding to said speech communication request.

8. A system according to claim 7, wherein said plurality of telephone sets each comprises request means for performing a connection request, and said control means controls said switch means such that said switch means connects said communication line to said telephone set performing said connection request.

9. A system according to claim 7, wherein said identification means identifies whether the communication partner is the other telephone set or not by discriminating whether or not the communication information from said line is an audio signal.

10. A system according to claim 7, further comprising detection means for detecting a communication request from said line, and wherein said identification means performs an identification when said detection means detects the communication request.

11. A system according to claim 7, wherein said data communication means encodes a read image signal into encoded image data and transmits the encoded image data.

12. A system according to claim 7, wherein said identification means performs an identification under the condition that said identification means is connected to the communication line by said switch means.

13. A system according to claim 7, wherein each of said plurality of telephone sets comprises a bell for informing a speech communication request.

14. A system according to claim 7, wherein each of said plurality of telephone sets comprises a handset and a hook switch, and said control means detects a response to said speech communication request according to a state of said hook switch.

15. A system according to claim 10, wherein said detection means detects a call signal as the communication request.

16. A system according to claim 7, wherein said data communication means performs an image record based on a received image signal or an image transmission based on a read image.

17. A system according to claim 7, wherein said control means simultaneously transmits said speech communication request to said plurality of telephone sets.

18. A system according to claim 7, wherein said control means controls said plurality of telephone sets through a control channel and said switch means connects said plurality of telephone sets through a communication channel.

19. A line exchange apparatus comprising:
connecting means for connecting either data communication means or a plurality of telephone sets to a communication line;
memory means for storing received communication information transmitted by said telephone sets according to an operation of a respective keyboard on each of said plurality of telephone sets; and
control means for controlling said telephone sets such that each of said plurality of telephone sets performs display according to said data communication means.

20. An apparatus according to claim 19, wherein the communication information includes a telephone number.

21. An apparatus according to claim 19, wherein said data communication means performs a facsimile communication.

22. An apparatus according to claim 19, wherein said connecting means connects said data communication means and a plurality of telephone sets to the communication line, and said connecting means is connected with said plurality of telephone sets through a plurality of speech communication channels.

23. An apparatus according to claim 19, wherein each said telephone set performs a speech communication through a speech communication channel, said connecting means and the communication line, and a reception means registers into said memory means the communication information received from said telephone set through a control channel.

24. An apparatus according to claim 19, wherein said control means controls said telephone sets such that said telephone sets display information obtained by said data communication means in a data communication.

25. A telephone exchange apparatus comprising:
connection means for selectively connecting to a single external line either image data communication means or a plurality of telephone sets;
detection means for detecting an image data-communication procedure signal on said external line; and
control means for controlling said plurality of telephone sets such that each of said plurality of telephone sets generates a call sound, when the image data-communication procedure signal is not detected by said detection means,
wherein said control means controls, when one of said telephone sets generating the call sound responds to said control means, said connection means such that said telephone set responding is connected to said external line.

26. An apparatus according to claim 25, wherein said control means causes, if the image data-communication procedure signal is detected by said detection means, said image data communication means to perform an image data communication.

27. An apparatus according to claim 25, wherein said detection means performs the detection in a state where said image data communication means is connected to said external line by said connection means.

28. An apparatus according to claim 25, wherein said image data communication means performs a facsimile communication.

29. An apparatus according to claim 25, wherein said control means generates a call sound by transmitting a ringing command to said plurality of telephone sets.

30. A line exchange method comprising the steps of:
a) judging whether or not an image data-communication procedure signal is transmitted from an external line;
b) substantially simultaneously calling a plurality of telephone sets if the image data-communication procedure signal is not transmitted; and
c) connecting, when one of the plurality of telephone sets responds to a call, the telephone set responding to the call to the external line.

31. A method according to claim 30, wherein during said calling step an image data communication is performed when the image data-communication procedure signal is transmitted.

32. A method according to claim 30, wherein during said calling step a ringing command is transmitted to the plurality of telephone sets.

33. A line exchange apparatus comprising:
connecting means for selectively connecting a data communication unit and plural telephone sets to an external line;
a memory for storing data for said data communication unit which data is transmitted by said plural telephone sets according to an operation of a respective keyboard on each of said plural telephone sets, said data communication unit executing a communication in accordance with the data stored in said memory; and
control means for controlling said plural telephone sets such that each of said plural telephone sets performs a display according to said data communication unit.

34. An apparatus according to claim 33, wherein said data communication unit performs a facsimile communication.

35. An apparatus according to claim 33, wherein the data for said data communication unit includes a user's abbreviated name.

36. An apparatus according to claim 33, wherein said control means controls said telephone sets such that said telephone sets display information obtained by said data communication means in a data communication.

37. An apparatus according to claim 33, wherein said control means controls said plural telephone sets through a control channel and said connecting means connects said plural telephone sets through a communication channel.

* * * * *